UNITED STATES PATENT OFFICE.

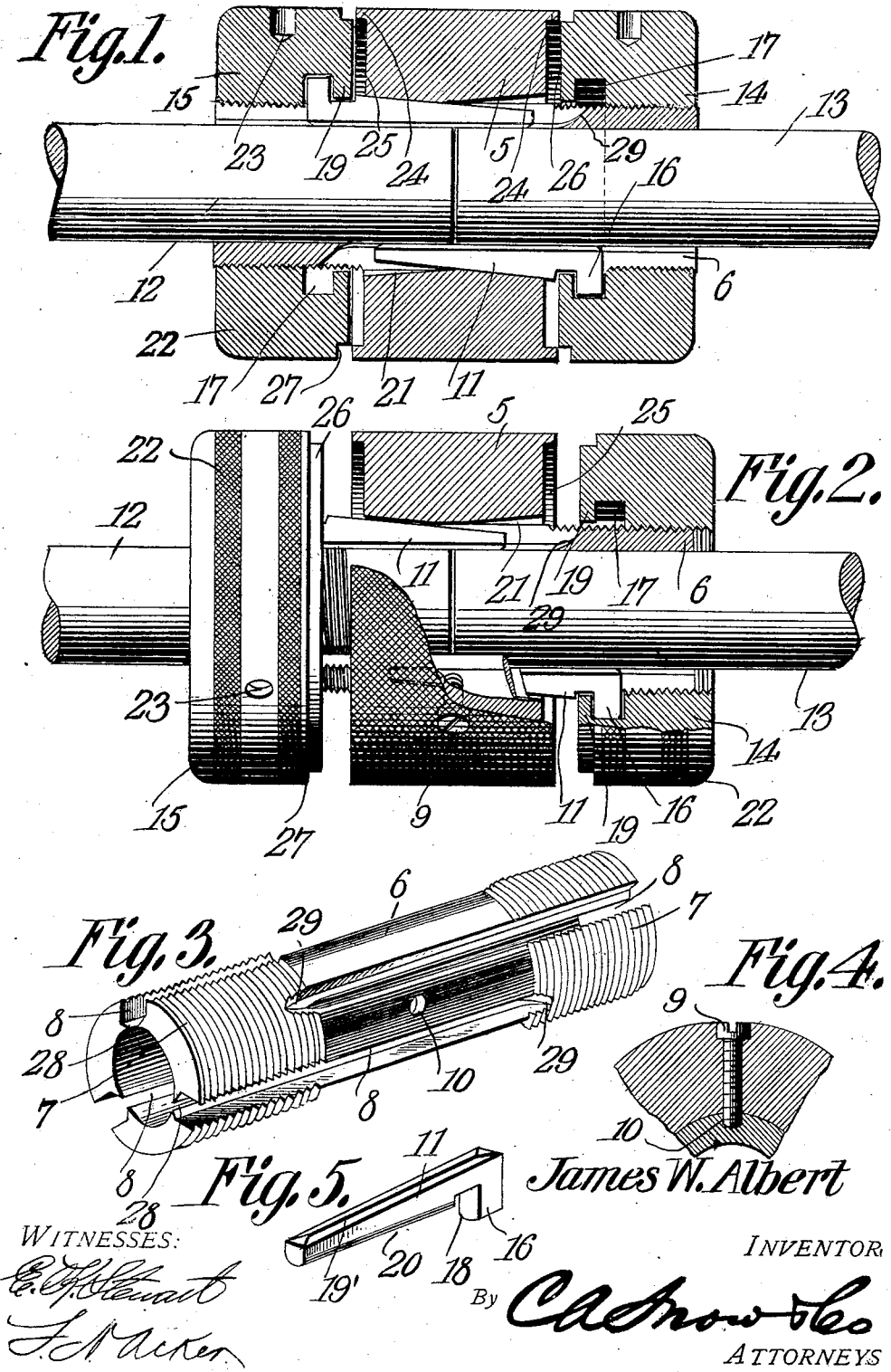

JAMES W. ALBERT, OF ONEIDA, NEW YORK.

SHAFT-COUPLING.

No. 856,199.     Specification of Letters Patent.     Patented June 11, 1907.

Application filed August 17, 1906. Serial No. 331,073.

*To all whom it may concern:*

Be it known that I, JAMES W. ALBERT, a citizen of the United States, residing at Oneida, in the county of Madison and State of New York, have invented a new and useful Shaft-Coupling, of which the following is a specification.

This invention relates to shaft couplings and has for its object to provide a comparatively simple and inexpensive device of this character by means of which the adjacent sections of drill-rods, shafting and the like may be quickly and securely coupled.

A further object of the invention is to provide a relatively stationary member or sleeve carrying a threaded bushing having elongated slots formed therein for the reception of the clutch members, the latter being movable to operative position in engagement with the adjacent shaft sections by means of collars mounted for rotation on the threaded ends of said bushings.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a longitudinal sectional view of a shaft-coupling constructed in accordance with my invention showing the clamping jaws or clutch members in inoperative position. Fig. 2 is a side elevation partly in section showing the clutch members released to permit the removal of the shaft sections. Fig. 3 is a perspective view of the bushing detached. Fig. 4 is a detail transverse sectional view. Fig. 5 is a perspective view of one of the clamping jaws or clutch members detached.

Similar numerals of reference indicate corresponding parts in all of the figures of the drawings.

The improved clutch or coupling is principally designed for uniting two or more sections of shafting, and consists of a relatively stationary sleeve 5 having a central opening formed therein for the reception of the tubular member or bushing 6 the opposite ends of which are threaded as indicated at 7.

The bushing 6 is formed with a plurality of elongated slots 8 preferably disposed in staggered relation and opening through the opposite ends of the bushing, as shown, said bushing being rigidly secured to the sleeve 5 in any suitable manner as by a clamping screw 9 engaging a recess or depression 10 formed in the exterior walls of the bushing between the walls of adjacent slots 8.

Seated within the slots 8 are a plurality of longitudinally movable clamping jaws or clutch members 11 adapted to engage the shaft-sections 12 and 13, said members being movable to operative position in engagement with the shaft-sections by means of suitable collars 14 and 15 engaging the threads on the opposite ends of the bushing, as shown.

The clutch members 11 are provided with lateral extensions 16 adapted to engage an annular groove or recess 17 formed in the collars 14 and 15, each clutch member being provided with a recess 18 to accommodate the annular lip 19 on the adjacent collar thereby to prevent accidental displacement of said clutch members. The active face of the clutch members 11 are formed with biting edges 19' while the opposite face of each clutch member is inclined or beveled at 20 for engagement with the correspondingly inclined face 21 of the stationary member or sleeve 5 so that by rotating the collars 14 and 15 the active faces of the clutch members will be forced inwardly and downwardly in engagement with the adjacent shaft-sections thereby securely clamping the same in coupled position.

The adjusting collars 14 and 15 are preferably serrated or roughened as indicated at 22 and are also provided with a plurality of spaced sockets or depressions 23 for the reception of a suitable operating tool to assist in rotating the collars thereby to effect the movement of the clutch members.

The sleeve or member 5 is preferably formed with oppositely disposed annular lips 24 defining circular recesses or depressions 25 which receive the extensions 26 on the adjusting collars 14 and 15 when the parts are moved to operative position thereby to assist in guiding the same, there being an annular shoulder 27 formed on the collars opposite the flanges 25, as shown.

As a means for preventing the clutch members 11 from falling through the slots 8 when the coupling is positioned on or removed from the shaft, the walls of said slots are provided with oppositely disposed laterally extending retaining flanges 28 inclined to conform to the inclination of the biting edges 19' and which serve to support the clutch members with their biting edges extending through the slots for engagement with the shaft, as best shown in Fig. 3 of the drawing. The closed ends of the slots 8 are also preferably curved upwardly, as indicated at 29 to facilitate the introduction and removal of the clutch members.

In operation when it is desired to couple two or more sections of drill-rod shafting, or the like, the collars 14 and 15 are adjusted laterally on the bushing 6 to release the clutch members after which the sections 12 and 13 are introduced within the sleeve 6 and the coupling adjusted longitudinally of said sections until the abutting ends thereof are centered within the sleeve 5 after which the collars 14 and 15 are rotated in the opposite direction thus forcing the biting edges 19' of the clutch members laterally in engagement with the shaft sections, as will be readily understood.

In order to release the coupling to permit the disconnection of the shaft-sections it is merely necessary to loosen the adjusting collars when the coupling may be adjusted longitudinally of one of the shaft-sections thereby permitting the adjacent shaft-section to be readily uncoupled or detached.

From the foregoing description it is thought that the construction and operation of the device will be readily understood by those skilled in the art and further description thereof is deemed unnecessary.

Having thus described the invention what is claimed is:

1. A shaft-coupling including a sleeve, a bushing secured to the sleeve and having its opposite ends threaded, clutch-members slidably mounted in the bushing and adapted to engage the shaft sections to be coupled, and collars engaging the threaded ends of the bushing for moving the clutch members to operative and inoperative positions.

2. A shaft-coupling including a sleeve, a bushing secured to the sleeve and provided with spaced elongated slots, clutch members slidably mounted in said slots and adapted to engage the shaft sections to be united, and collars mounted for rotation on the bushing and operatively connected with the clutch members for moving the latter to operative and inoperative positions.

3. A shaft-coupling including a sleeve, a bushing secured to the sleeve and provided with a plurality of spaced slots disposed in staggered relation and opening through the opposite ends of the bushing, clutch members slidably mounted in said slots and adapted to engage the shaft sections to be united, and means operatively connected with the clutch members for moving the latter to operative and inoperative positions.

4. A shaft-coupling including a sleeve having its interior walls inclined in opposite directions, a bushing disposed within the sleeve and provided with a plurality of spaced slots arranged in staggered relation and opening through the opposite ends of the bushing, clutch members slidably mounted for longitudinal movement in said slots and adapted to engage the shaft-sections, and collars mounted for rotation on the bushing and operatively connected with the clutch members for moving the latter to operative and inoperative positions.

5. A shaft-coupling including a sleeve provided with a central opening the walls of which are inclined in opposite directions, a bushing seated within the opening and having its opposite ends threaded, said bushing being provided with a plurality of spaced slots disposed in staggered relation and opening through the opposite ends of the bushing, clutch members mounted for longitudinal movement within the slots and provided with inclined faces adapted to engage the inclined faces of the sleeve, and collars threaded on the bushing and connected with the clutch-members for moving the latter to operative position in engagement with the shaft sections to be coupled.

6. A shaft-coupling including a sleeve having a central opening formed therein the walls of which are inclined in opposite directions, a bushing rigidly secured to the sleeve and having its opposite ends threaded, there being a plurality of longitudinal slots formed in the walls of the bushing and opening through the opposite ends thereof, clutch members mounted for longitudinal movement in said slots and each having one face thereof inclined for engagement with the adjacent inclined walls of the sleeve and its opposite face provided with a biting edge adapted to bear against shaft sections to be coupled, and collars threaded on the bushing and connected with the clutch members for moving the latter to operative and inoperative positions.

7. A shaft-coupling including a sleeve provided with oppositely disposed recesses defining annular flanges and pierced by a central transversely disposed opening the walls of which are inclined or beveled, a threaded bushing seated in said opening and provided with a plurality of spaced slots disposed in staggered relation and opening through the opposite ends of said bushing, collars threaded on the bushing and provided with annular grooves, clutch members slidably mounted for longitudinal movement in said slots and adapted to engage the shaft sections to be coupled, said clutch-members being each provided with a lateral extension seated within the annular groove of the adjacent collar, and a screw carried by the sleeve and engaging the bushing for preventing independent rotation of the same, there being a plurality of openings formed in the peripheries of the collars for the reception of an operating tool.

8. A shaft coupling including a bushing provided with spaced elongated slots the walls of which are provided with inwardly extending retaining flanges, clutch members slidably mounted on said flanges and adapted to engage the shaft sections to be united, and means operatively connected with the clutch members for moving the latter to operative and inoperative positions.

9. A shaft coupling including a sleeve, a threaded bushing secured to the sleeve and provided with spaced elongated slots the walls of which are formed with inwardly extending retaining flanges, clutch members slidably mounted on said flanges and extending through the slots for engagement with the shaft sections to be united and collars threaded on the bushing and operatively connected with the clutch members for moving the latter to operative and inoperative positions when said collars are rotated.

In testimony that we claim the foregoing as our own, we have hereto affixed our signatures in the presence of two witnesses.

JAMES W. ALBERT.

Witnesses:
H. S. HILTS,
JOHN J. KELLY.